United States Patent [19]

Harms

[11] Patent Number: 5,480,160
[45] Date of Patent: Jan. 2, 1996

[54] SHAFT SEAL WITH IN-LINE SEALING RINGS

[75] Inventor: Axel Harms, Dachau, Germany

[73] Assignee: MTU Motoren-und Turbinen-Union Muenchen GmbH, Munich, Germany

[21] Appl. No.: 236,376

[22] Filed: May 2, 1994

[30] Foreign Application Priority Data

May 6, 1993 [DE] Germany ............. 43 15 004.7

[51] Int. Cl.⁶ .................. F16J 15/16; F16J 15/40
[52] U.S. Cl. .................... 277/3; 277/59
[58] Field of Search .................. 277/3, 45, 53, 277/58, 59, 69

[56] References Cited

U.S. PATENT DOCUMENTS

| 2,908,516 | 10/1959 | Stein . | |
|---|---|---|---|
| 2,971,783 | 2/1961 | Laser | 277/59 X |
| 3,013,824 | 12/1961 | Wilson | 277/58 X |
| 3,119,623 | 1/1964 | Shevchenko | 277/59 X |
| 3,172,671 | 3/1965 | Downs | 277/59 X |
| 3,333,856 | 8/1967 | Voitik | 277/59 |
| 3,825,270 | 7/1974 | Paramonoff et al. | 277/59 X |
| 3,869,131 | 3/1975 | Derner | 277/59 X |
| 4,421,324 | 12/1983 | Yamamoto et al. | 277/59 X |
| 4,482,158 | 11/1984 | Ishitani et al. | 277/59 X |
| 4,756,536 | 7/1988 | Belcher | 277/59 X |
| 4,984,811 | 1/1991 | Kuwabara et al. | 277/59 X |

FOREIGN PATENT DOCUMENTS

| 2646475 | 12/1977 | Germany . | |
| 1389832 | 4/1975 | United Kingdom | 277/59 |

Primary Examiner—William A. Cuchlinski, Jr.
Assistant Examiner—John L. Beres
Attorney, Agent, or Firm— W. G. Fasse; W. F. Fasse

[57] ABSTRACT

A shaft seal (5) for circumferential shaft speeds in excess of 30 m/s and for sealing a differential pressure between two chambers to be sealed, in excess of 100 kP, has several in-line sealing rings (12A, 12B, 20, 22). Preferably, at least two of the high-pressure side seal rings are constructed as slide seal rings (12A, 12B) that are urged against the shaft by a tension spring (17) surrounding the outer circumferential surface of the slide seal rings. One low-pressure side sealing ring is a brush seal (20). A compressed air seal ring (22) is arranged between this brush seal (20) and the slide seal rings (12A, 12B). The air seal ring (22) forms a radial air gap (24) around the shaft (1). In operation of the seal the pressure in the air gap (24) is lower than the pressure in the high-pressure chamber (HD) and higher than the pressure in the low-pressure chamber (ND), whereby a high sealing integrity and resistance to abrasive wear at very high circumferential shaft speeds in excess of 100 m/s and at high differential pressures are maintained.

14 Claims, 2 Drawing Sheets 5,480,160

SHAFT SEAL WITH IN-LINE SEALING RINGS

FIELD OF THE INVENTION

This invention relates to a shaft seal for sealing two chambers wherein different pressures are maintained, from each other. The seal has several sealing rings arranged in a casing axially in series relative to each other. Generally, several of these sealing rings take the shape of mutually abutting, circumferentially segmented slide rings which are elastically urged against the shaft.

BACKGROUND INFORMATION

U.S. Pat. No. 2,908,516 (Stein), issued on Oct. 13, 1959, discloses a shaft seal of the type described above. Sliding ring seals are generally used where the r.p.m. and peripheral speeds are high. Such sliding ring seals are used to maximally avoid the exchange of fluid or pressure equalization between two chambers partitioned by a machine casing through which the shaft extends. Sliding ring seals often have slots or grooves in their circumferential surface facing the shaft, said slot communicating with a fluid chamber of the casing. Due to the hydrodynamic action of the fluid between the shaft and sliding rings, these rings lift clear off the shaft thereby reducing the abrasive seal wear. Such sliding constructions have been disclosed, for example in German Patent Publication DE 2,646,475 B2 (Stein), published Dec. 15, 1977. However, to limit the leakage through the clearance between the shaft and the sliding ring, U.S. Pat. No. 2,908,516 (Stein) teaches using a tension spring around the casing facing the circumferential surface of the circumferentially segmented slide ring to urge the ring against the shaft.

However, it has been shown that such slide ring seals are no longer sufficient to ensure the necessary sealing integrity when circumferential speeds exceed about 30 m/s and a differential pressure between the two chambers to be sealed from each other exceeds 100 kPa.

OBJECT OF THE INVENTION

In view of the above it is an object of the present invention to provide a shaft seal of the type described above that minimizes the leakage flow between the two chambers to be sealed and which chambers contain different pressures even at elevated circumferential shaft speeds exceeding 30 m/s and to minimize abrasive shaft seal wear during operation even at these speeds and at differential pressures exceeding 100 kPa.

SUMMARY OF THE INVENTION

The present invention has achieved the above object by providing a brush seal at the low-pressure side of the casing, a slide ring seal on the high pressure side of the shaft, and a pressurized air seal between the brush seal and the slide ring seal. The air seal is formed in cooperation with the shaft to form a radial gap that is pressurized with sealing air, so that the sealing air pressure is lower than the pressure in the high-pressure chamber and higher than the pressure in the low-pressure chamber.

The arrangement of the present invention has the advantage that the leakage flow is held within acceptable limits even at circumferential shaft speeds in excess of 100 m/s and at rotational shaft speeds in excess of 15000 r.p.m. The high sealing integrity of the present sealing arrangement, compared to prior art solutions, at the specified high circumferential shaft speeds, results from the insertion of the pressurized air seal between the sliding rings at the high-pressure side and the brush seal at the low-pressure side, whereby the escape of sealing air into the low-pressure chamber is substantially reduced. The invention makes possible a pressure adjustment of the sealing air which beneficially influences the hydrodynamic sealing gap characteristics between the shaft and the slide seal rings to optimize the sealing integrity and service life of the sealing rings. No substantial rise in leakage flow has been noted even at differential pressures of 200 kPa and more between the two chambers to be sealed from each other. Further, the compact axial arrangement of the sealing rings reduces the space required in the radial direction.

The sliding rings are preferably made of a polyamide having graphite added thereto. This material known under its VESPEL trademark, is characterized by an improved resistance to abrasive wear and a long-term resistance to heat. The graphite content is sufficient to provide a good slidability. The sliding rings are locked against a circumferential rotation, whereby during operation, the circumferential abutments between the slide ring segments are prevented from angularly displacing away from the intended offset arrangement. Thus, a reducing of the sealing integrity of the shaft seal is also prevented. The best sealing integrity is achieved when the sliding rings form a ring gap between the casing and their outer circumferential ring surface, which ring gap is hermetically sealed relative to the high pressure chamber. It has been found in operation that at a pressure in the ring gap between the sliding ring or rings and the casing smaller than the high pressure in the high pressure chamber, results in an optimal hydrostatic sliding film formed between the slide ring or rings and the shaft whereby abrasive wear of the slide rings is minimized while maintaining the good sealing integrity or sealing quality of the shaft seal.

An equally advantageous effect on the shaft seal action is provided by a modified embodiment of the invention wherein the slide rings are encircled at their outer circumferential surface by a segmented support ring which compresses the slide rings against the shaft with a tension spring surrounding the outer circumferential surface of the support ring which is capable of being compressed radially inwardly toward the shaft. An advantage is further provided in that the need for a plurality of easily failing tension springs is eliminated. The ease of installation and functional integrity of the shaft seal can be further improved by holding the seal rings axially between the flanks of a U-section ring housing.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
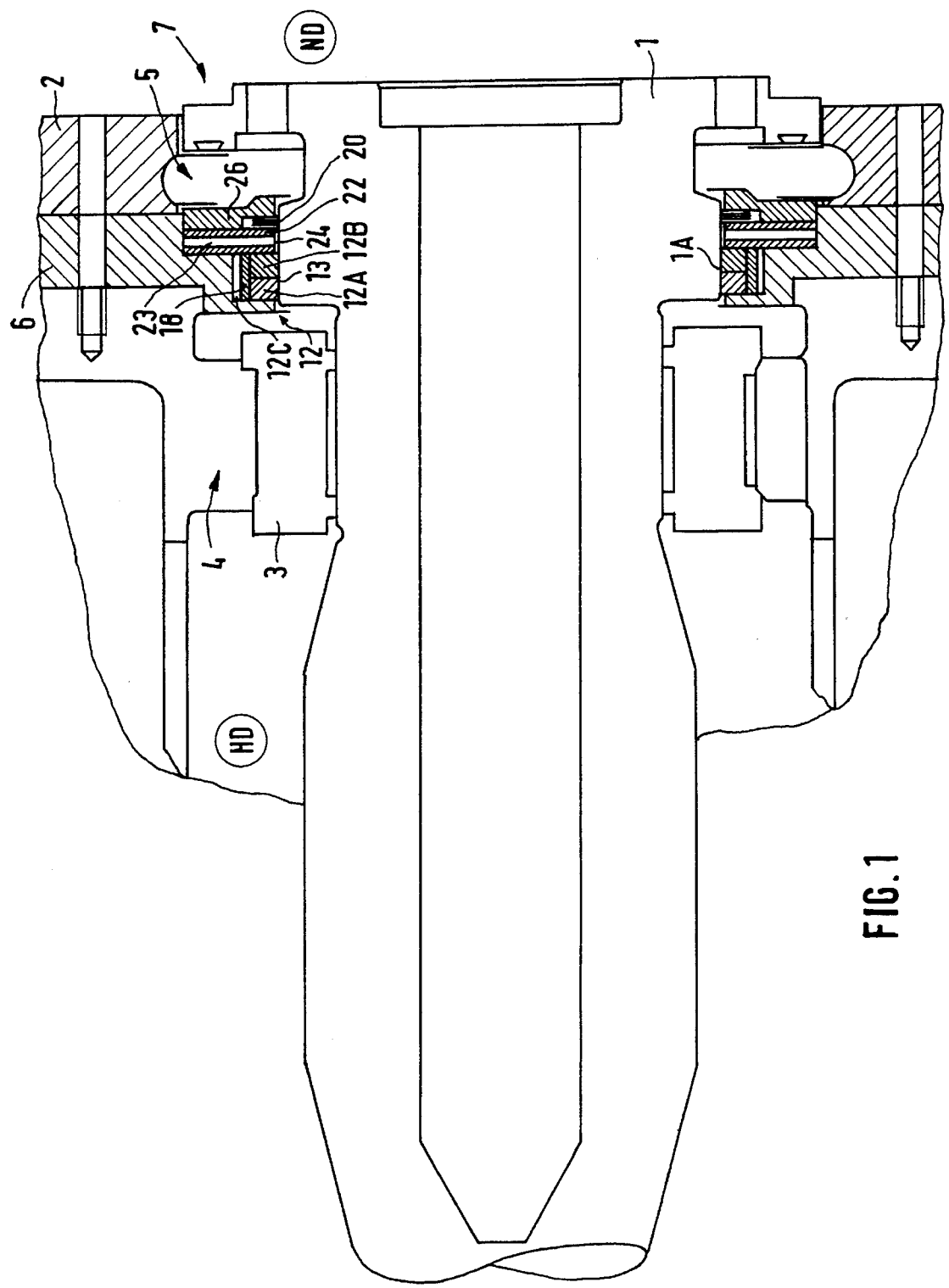
FIG. 1 is a partial, longitudinal sectional view illustrating a shaft bearing and shaft seal in a machine casing.

FIG. 1 shows a bearing 3 supporting a shaft 1 in a machine casing 2. The bearing 3 is concentrically arranged between the shaft 1 and the bearing seat 4 of the machine casing 2 and may be constructed as an anti-friction roller or ball bearing or as a slide or sleeve bearing.

A shaft seal 5 is arranged concentrically between the shaft 1 and a seal seat 6 of the machine casing 2. The seal 5 is axially spaced from the bearing 3. The shaft 1 passes through an opening 7 in the machine casing 2. The opening 7 holds the bearing seat 4 and a seal mounting ring 6. The machine casing 2 spatially separates a high-pressure chamber HD from a low-pressure chamber ND. The shaft seat 5 of the shaft 1 extending from the high-pressure chamber HD to the interior of the low-pressure chamber ND seals the machine casing 2 relative to the high-pressure chamber HD and relative to the low pressure chamber ND to prevent leakage or pressure loss.

Referring further to FIG. 1, the seal 5 comprises at least three different types of sealing rings, namely a brush seal ring 20, a compressed air seal ring 22, and a slide seal ring 12 having for example two slide ring sections 12A and 12B. The seal ring sections 12A, 12B have a radially inwardly shaft facing seal surface 13 in sliding contact with a seat seal surface 1A of the shaft 1. Preferably, the sealing slide ring sections 12A, 12B are held together by a support ring 18 shown in more detail in FIG. 3. A radially outer ring gap 12C around the ring sections 12A, 12B or around the support ring 18 is sealed in a pressure-tight manner relative to the high-pressure chamber HD. The brush seal ring 20 is mounted in a brush holder ring 26. The compressed air seal ring 22 has at least one, preferably radially extending bore 23 for introducing pressurized sealing air into an air gap 24 between the shaft seal surface 1A and the radially inwardly facing surface of the air seal ring 22.

Figure 3:
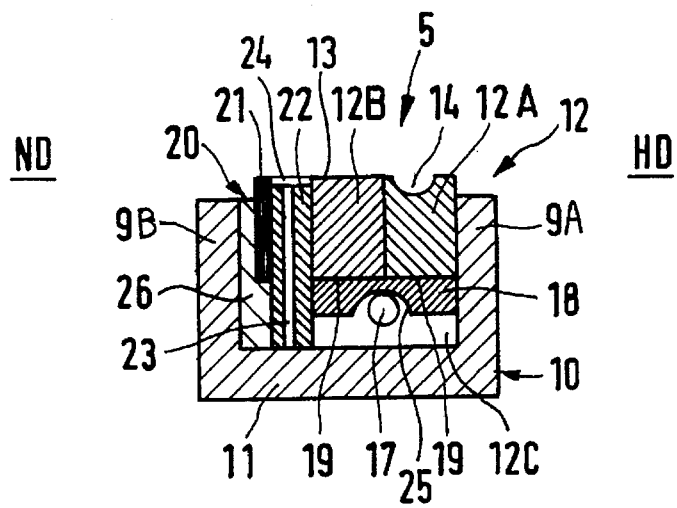
FIG. 3 is a cross-sectional view illustrating the shaft seal and ring housing along section line III—III in FIG. 2.
Figure 2:
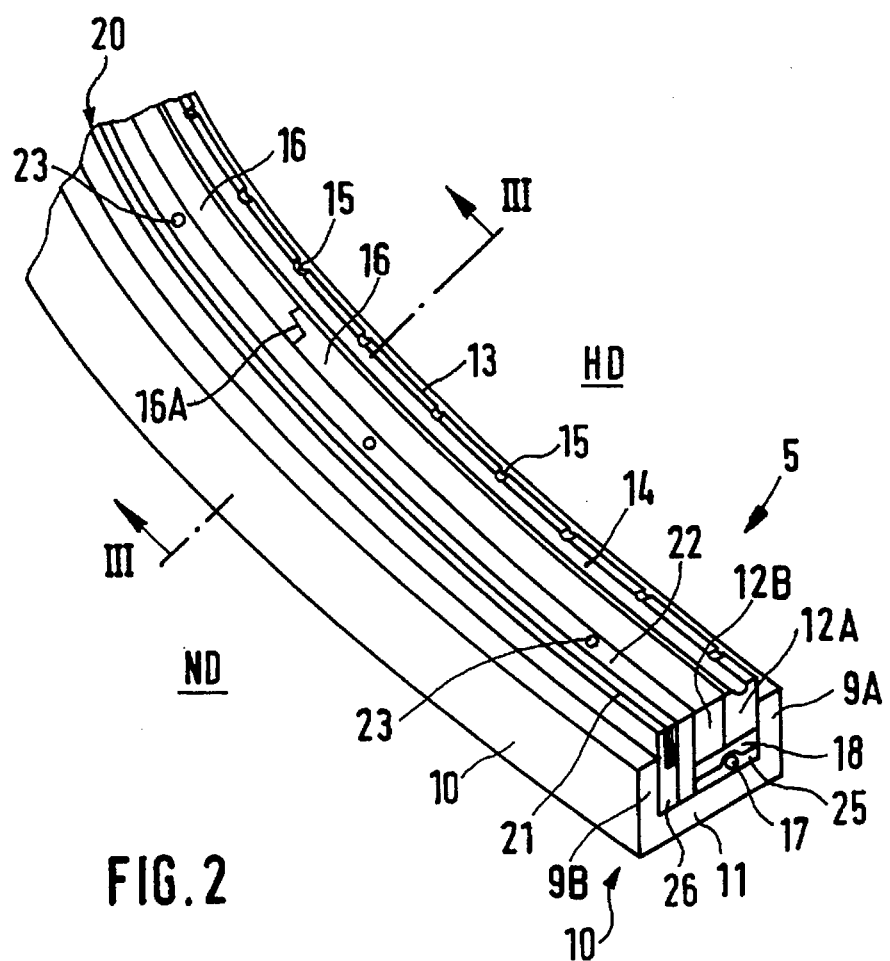
FIG. 2 is a perspective partial view illustrating a shaft seal and ring housing.

As is shown in greater detail in FIGS. 2 and 3, the shaft seal 5 comprises the above mentioned four sealing rings 12A, 12B, 22, and 20 placed axially in series one behind the other and in lateral contact with each other. FIGS. 2 and 3 show an alternative arrangement compared to FIG. 1 where the sealing rings are held in the machine casing 2. In FIGS. 2 and 3 the sealing rings are held axially between the flanks 9A and 9B of a U-section ring housing 10. For this purpose, the two flanks 9A, 9B extend radially inwardly, and the web 11 connecting the flanks 9A and 9B of the ring housing 10 is arranged concentrically with the shaft 1 so that the web 11 forms a radial termination of the shaft seal 5. As shown in FIGS. 2 and 3, the two mutually abutting sealing slide ring sections 12A, 12B have the shape of segmented sliding rings 12A and 12B. To form an optimal hydrodynamic fluid film between the seal surface 1A of the shaft 1 and the seal surface 13 of the sliding ring 12, the flank facing side of the slide ring 12A is provided at its running seal surface 13, i.e. at its shaft facing inner circumferential surface, with a circumferentially extending groove 14. The fluid in the groove 14 communicates with the fluid in the adjacent high-pressure chamber HD through a plurality of circumferentially spaced-apart ducts 15. To ensure that the slide seal rings 12A and 12B can make radial compensation movements, the sliding ring sections 12A and 12B are made of ring segments 16. The circumferentially abutting ends 16A between the sliding ring segments 16 of one sliding ring section 12A are circumferentially offset relative to those of the second sliding ring section 12B and vice versa. This feature improves the sealing integrity. Close contact of the two sliding ring sections 12A, 12B with the shaft 1 is ensured by an annular tension spring 17. This spring runs preferably around the radially outer circumference of a segmented support ring 18 that can yield elastically radially inwardly, whereby the support ring 18 envelopes the two sliding ring sections 12A, 12B at their radially outer circumferential surfaces 19. Hence, the tension spring 17 urges the sliding ring sections 12A, 12B radially toward the shaft 1. This is possible due to the yielding of the support ring 18. Preferably, the tension spring 17 is positioned in a radially outwardly open groove 25 in the support ring 18 and the groove is preferably centrally located in the ring 18.

The shaft seal 5 further comprises a brush seal 20 including bristles 21 held in a brush holder ring 26 of the brush seal 20. The bristles 21 are in contact with the shaft 1, thereby increasing the sealing action of the shaft seal 5. The brush seal 20 is preferably positioned on the low pressure side of the shaft 1 next to the low pressure chamber ND.

The two sliding seal ring sections 12A and 12B of the shaft seal 5 are preferably positioned next to the high pressure side HD of the seal with the ring 12A in contact with the flank 9A of the housing ring 10 as best seen in FIG. 2. The brush holder ring 26 is in contact with the flank 9B of the housing ring 10. A compressed air seal ring 22 is arranged axially between the bristle side of the brush seal 20 and the seal slide ring section 12B. The compressed air seal ring 22 has air supply holes or bores 23 preferably radially arranged. The ring 22 is so dimensioned that a compressed air sealing gap 24 is formed radially between the shaft 1 and the radially inner circumferential surface of the ring 22. This gap 24 is pressurized with a sealing air pressure which, in operation, is adjusted to be higher than the pressure in the low-pressure chamber ND and lower than the pressure in the high-pressure chamber HD.

The sealing action is optimal when the shaft seal 5 is installed in the machine casing 2 so that the sliding sealing ring sections 12A and 12B are positioned next to the high pressure chamber HD and the brush seal 20 is positioned next to the low pressure chamber ND as mentioned.

Although the invention has been described with reference to specific example embodiments, it will be appreciated that it is intended to cover all modifications and equivalents within the scope of the appended claims.

What is claimed is:

1. A shaft seal with in-line sealing rings for sealing chambers (HD, ND) in a machine casing from each other, one chamber (HD) holding a high pressure, the other chamber (ND) holding a lower pressure, said shaft seal comprising a plurality of seal rings arranged along a shaft (1) passing from one chamber into the other, said seal rings contacting each other in the axial direction, said seal rings comprising at least one slide seal ring (12) positioned next to said high pressure chamber (HD) and including a plurality of circumferentially arranged sealing segments (16), at least one brush seal ring (20) positioned next to said lower pressure chamber (ND), and at least one compressed air gap seal ring (22) positioned between said slide seal ring (12) and said brush seal ring (20), said compressed air gap seal ring (22) forming an air gap (24) around said shaft, said compressed air gap seal ring (22) having at least one bore (23) for admitting air under a sealing pressure into said air gap (24), said sealing pressure in said air gap (24) being lower than said high pressure in said high pressure chamber (HD) and higher than said lower pressure in said lower pressure chamber (ND) in operation.

2. The shaft seal of claim 1, wherein said slide seal ring (12) comprises two slide seal ring sections (12A, 12B) both of which are made of a polyamide including a graphite component in said polyamide.

3. The shaft seal of claim 1, wherein said slide seal ring (12) comprises two slide seal ring sections (12A, 12B) positioned axially in contact with each other and comprising means (17) for preventing a displacement of said seal ring sections (12A, 12B) relative to each other in the circumferential direction.

4. The shaft seal of claim 1, further comprising a seal seat (6) surrounding said plurality of seal rings, and a ring gap (12C) extending circumferentially around said slide seal ring (12) and between a radially inwardly facing surface of said seal seat (6) and a radially outwardly facing surface of said slide seal ring (12), said ring gap (12C) being sealed in a pressure-tight manner relative to said high pressure chamber (HD).

5. The shaft seal of claim 1, wherein said slide seal ring (12) comprises a plurality of ring segments (16), said shaft seal further comprising a support ring (18) surrounding a radially outwardly facing surface of said ring segments (16), and a circular tension spring (17) surrounding said support ring (18) for urging said ring segments radially inwardly against a seal seat (1A) of said shaft (1).

6. The shaft seal of claim 5, wherein said slide seal ring (12) comprises two slide seal ring sections (12A, 12B), each slide seal ring section (12A, 12B) having a plurality of ring segments (16), said support ring (18) surrounding said ring segments (16) of both slide seal ring sections (12A, 12B) in a yielding manner for enabling said circular tension spring (17) to urge all ring segments of both ring sections radially inwardly against said seat seal (1A) of said shaft (1).

7. The shaft seal of claim 6, wherein said support ring (18) is circumferentially segmented and has a radially outwardly open groove (25) in its radially outwardly facing surface, and wherein said circular tension spring (17) is positioned in said groove (25).

8. The shaft seal of claim 7, wherein said groove (25) and said circular tension spring (17) are positioned symmetrically in a radial plane between said two ring sections (12A, 12B).

9. The shaft seal of claim 1, further comprising a seal ring housing (10) having a radially inwardly open U-section, said plurality of seal rings (12, 20, 22) being held in said ring housing (10).

10. The shaft seal of claim 1, wherein said slide seal ring (12) comprises in its shaft facing slide surface (13) a radially inwardly open groove (14) and ducts (15) communicating said groove (14) with fluid under pressure in said high-pressure chamber (HD).

11. The shaft seal of claim 10, wherein said slide seal ring (12) comprises at least two slide seal ring sections (12A, 12B), said radially inwardly open groove (14) and said ducts (15) being provided in the slide seal ring section (12A) closest to said high-pressure chamber (HD).

12. The shaft seal of claim 1, wherein said at least one bore (23) in said air gap seal ring (22) extends radially toward said air gap (24) and communicates with a fluid under pressure.

13. The shaft seal of claim 1, wherein said brush seal (20) comprises a bristle holder ring (26) and sealing bristles (21) held in said bristle holder ring (26).

14. The shaft seal of claim 13, wherein said bristles (21) seal said air gap (24) on an axial end face facing toward said lower pressure chamber (ND), and wherein said slide seal ring (12) seals said air gap (24) on an axial end face facing toward said high-pressure chamber (HD).

* * * * *